(12) United States Patent
Heusel et al.

(10) Patent No.: US 7,661,615 B2
(45) Date of Patent: Feb. 16, 2010

(54) GRID CUTTING DEVICE

(75) Inventors: Jörg Heusel, Stuttgart (DE); Tobias Meck, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 629 days.

(21) Appl. No.: 11/254,538

(22) Filed: Oct. 20, 2005

(65) Prior Publication Data

US 2006/0081103 A1  Apr. 20, 2006

(30) Foreign Application Priority Data

Oct. 20, 2004  (DE)  .................. 20 2004 016 214 U

(51) Int. Cl.
*B02C 7/04* (2006.01)
*B02C 13/20* (2006.01)

(52) U.S. Cl. ...................................... 241/235; 241/242

(58) Field of Classification Search ................ 241/235, 241/243, 242; 83/284, 52
See application file for complete search history.

(56) References Cited

U.S. PATENT DOCUMENTS

| 3,589,221 | A | | 6/1971 | Deegan |
| 4,295,399 | A | | 10/1981 | Finsterwalder et al. |
| 4,513,918 | A | * | 4/1985 | Parson et al. ............. 241/101.4 |
| 4,590,978 | A | * | 5/1986 | Kintz et al. ................. 144/174 |
| 5,474,239 | A | * | 12/1995 | Williams et al. .............. 241/73 |
| 7,070,132 | B1 | * | 7/2006 | Gassman ...................... 241/28 |

FOREIGN PATENT DOCUMENTS

| DE | 1 962 104 | 6/1967 |
| DE | 15 52 623 | 12/1969 |
| DE | 23 32 060 | 1/1975 |
| DE | 28 31 953 | 12/1979 |
| DE | 79 34 867 | 12/1979 |
| DE | 269 800 | 7/1989 |
| DE | 294 649 | 10/1991 |
| DE | 41 30 673 | 3/1993 |
| DE | 43 19 300 | 12/1994 |
| DE | 4 328 687 | 3/1995 |
| DE | 1981 8234 | 10/1999 |
| EP | 0 580 576 | 7/1998 |
| GB | 2 237 527 | 5/1991 |

OTHER PUBLICATIONS

Schweitzer, "Prozessspezifische Merkmale des Rotationsschneidens", ISBN 3-89791-214-7, Jun. 25, 2001, Abstract only.

* cited by examiner

*Primary Examiner*—Bena Miller
(74) *Attorney, Agent, or Firm*—Fish & Richardson P.C.

(57) ABSTRACT

A device for comminuting a residual sheet metal grid includes a grid supply system defining a grid supply plane and supplying the grid in a longitudinal direction; and a cutting assembly including a plurality of shearing teeth extending along a transverse direction transverse to the longitudinal direction. The shearing teeth can include a cutting edge, a cutting edge portion, or both a cutting edge and a cutting edge portion. The cutting assembly can be constructed and arranged to cut the metal grid along the longitudinal direction and the transverse direction.

24 Claims, 7 Drawing Sheets

GRID CUTTING DEVICE

CROSS REFERENCE TO RELATED APPLICATIONS

This application claims priority to German Utility Model Application DE 20 2004 016 214.8, filed on Oct. 20, 2004, the entire contents of which are hereby incorporated by reference.

TECHNICAL FIELD

The description relates to a residual grid cutting device for comminuting residual sheet metal grids which have been processed with sheet metal processing machines.

BACKGROUND

Specific geometric shapes are cut out by means of a laser or stamped out by stamps from large metal sheets by sheet metal processing machines. A residual sheet metal grid is left over as a waste product requiring disposal. The residual sheet metal grid can be removed from the sheet metal processing machine manually or automatically and discarded in a container in a complete or folded state. However, residual sheet metal grids of this type are generally large and unwieldy. This impairs the production operation because wide transport paths are necessary, the process reliability may suffer and the space inside the container is not fully used. Therefore, it has already been proposed to stamp or cut up the residual grids, for example, with a laser machine. Whilst the laser machine cuts up the residual sheet metal grids, it is not available for processing the sheet metal. The comminution of the residual sheet metal grids therefore impedes optimum use of the laser machine for processing sheet metal.

As an alternative, it has been proposed to break down the residual sheet metal grids into strips by means of a guillotine shears following the production of the parts. However, those strips still have the same width as the original residual sheet metal grids. Handling such strips remains difficult. Furthermore, containers are not properly used.

SUMMARY

According to one aspect, a device for cutting up residual sheet metal grids includes a cutting mechanism which has, transversely to the residual grid supply direction, a plurality of shearing teeth which are constructed and arranged in such a manner that the residual sheet metal grids are cut into pieces both in relation to the residual grid width and in relation to the residual grid length. With a residual grid cutting device of this type, planar residual sheet metal grids or residual sheet metal grids having slight deformations which are produced during processing on stamping or laser machines can be cut up into small pieces. The number of pieces relative to the residual grid width can be determined by the number of shearing teeth. The residual grid pieces obtained in this manner can be of a size that allows optimum use of the space in a container. The residual grid cutting device can be operated in isolation or can be arranged downstream of a sheet metal processing machine and consequently be linked thereto. Long transport paths can thereby be prevented and the residual sheet metal grids can be comminuted by the residual grid cutting device directly after being processed by the sheet metal processing machine.

In one embodiment, at least one cutting edge or one cutting edge portion of a shearing tooth can be orientated in such a manner that it comes into engagement with the residual sheet metal grid, during a cutting operation, first by means of a first end and then by means of a second end. This means that cutting is carried out by the shearing teeth, not stamping. The cutting edge comes into contact with the residual sheet metal grid only gradually during the cutting operation. Less force is thereby required in order to comminute the residual sheet metal grid. Consequently, the residual grid cutting device can be operated so as to optimize the forces applied. For example, a configuration of the cutting edge is also possible in which the cutting edge has two cutting edge portions which are orientated obliquely relative to the residual grid supply plane and together form a tip which comes into engagement first with the residual sheet metal grid. The ends of the cutting edge portions remote from the tip come into engagement with the residual sheet metal grid later.

It is possible to bring about engagement of the cutting edge in the residual sheet metal grid, which engagement continues with the cutting movement, if at least one cutting edge of a shearing tooth is orientated obliquely relative to the residual grid supply plane. This means that the engagement of the cutting edge in the residual sheet metal grid extends during the cutting movement from one end of the cutting edge to the other end of the cutting edge.

In one embodiment, the shearing teeth have at least one cutting edge which is orientated transversely to the residual grid supply direction. The cutting edge can form an angle $\alpha$ in the range $0 < \alpha \leq 90°$ relative to the residual grid supply direction. The orientation of the cutting edge determines the shape of the residual grid pieces into which the residual sheet metal grid is comminuted. If a first cutting edge of a cutting tooth is orientated perpendicularly to the residual grid supply direction, another cutting edge can be orientated parallel with the residual grid supply direction so that rectangular residual grid pieces are cut out. It is also possible to orientate a cutting edge parallel with the residual grid supply direction and to orientate a second cutting edge at an angle in the order of $0 < \alpha \leq 90°$ relative to the residual grid supply direction so that a sawtoothlike cutting edge is produced.

In some constructions, the cutting teeth have two cutting edges which are orientated transversely to the residual grid supply direction. The cutting edges preferably converge at a tip.

In such an orientation of the cutting edges, a saw-toothlike contour can be obtained. Depending on the construction of the shape of the saw teeth, lateral movement of the residual sheet metal grid or the cutting mechanism may be necessary in order to ensure that not only zig-zag-like strips, but also pieces which are actually smaller are sheared off and splitting of the residual sheet metal grid is brought about relative to the width thereof.

In a particularly preferred configuration, it may be provided that the cutting edges of a shearing tooth are of different lengths. This means that an asymmetrical saw-tooth shape is produced. With a saw-tooth shape of this type, lateral movement of the residual sheet metal grid or the cutting mechanism is not necessary in order to bring about comminution in the longitudinal and transverse direction of the residual sheet metal grid.

The cutting mechanism is preferably in the form of a step type shearing device which has, transversely to the residual grid supply direction, a plurality of shearing teeth which can be driven by at least one stroke device and which can be moved past a support face for the residual sheet metal grid.

The contour of the support face is advantageously adapted to the contour of the shearing teeth. Variable possible uses result when a stroke device is provided for each shearing tooth. This means that the cutting teeth can be moved individually, in particular individually one after the other, in the case of relatively thick residual sheet metal grids in order to comminute the residual sheet metal grid into individual pieces. By the stroke devices being controlled in a suitable manner, however, the shearing teeth can also be moved simultaneously if, for example, relatively thin metal sheets have to be comminuted. Shearing teeth of the same type can be arranged on the individual stroke devices, in particular shearing teeth which have the same dimensions.

In some embodiments, the device includes a shearing tooth holder, on which the shearing teeth are arranged and which can be driven by at least one stroke device. This means that the shearing teeth are moved together irrespective of the thickness of the residual sheet metal grid. It is advantageous for the shearing teeth to have different heights. The stroke device must therefore apply smaller forces for shearing off the residual grid pieces. The shearing teeth do not all have to be moved simultaneously through the metal sheet.

If the cutting mechanism is in the form of a step type shearing device, the residual grid is not automatically drawn in. Therefore, it is advantageous for the residual grid supply system to be in the form of a drivable residual grid transport device.

In a preferred configuration, it is provided that the residual grid cutting device is operated in a clocked manner and the advance of the residual grid transport device is adapted to the size, in particular the depth, of the shearing teeth or a stop which limits the advance is provided for the residual sheet metal grid. During clocked operation, the residual sheet metal grid is moved forwards between two strokes of the shearing teeth. The forward movement is of such a magnitude that not only are strips separated from the residual sheet metal grid, but also the strips further broken down into smaller pieces. It may be necessary for cutting edges produced in a first cutting operation to be crossed by the cutting edges of the cutting teeth in a second cutting operation. As an alternative or in addition, at least one stop may be provided for the residual sheet metal grid and determines the extent to which the residual sheet metal grid is moved under the shearing teeth.

The advance or the position of the stop can be adjusted in such a manner that an overlapping cut is produced. The at least one stop can be arranged on a shearing tooth. In particular, each shearing tooth can have a stop.

Consequently, the stop can be moved with the shearing tooth. The shearing teeth can be moved so far upwards that the residual sheet metal grid can be moved completely under the cutting teeth, if necessary. If the shearing teeth are changed in order to obtain a different cutting geometry, the stop is also automatically changed. The advance is thereby always correctly adjusted to the shearing tooth depth of the shearing tooth currently being used.

In some other implementations, the shearing teeth are arranged on mutually opposite shearing tooth holders. It is particularly preferable for the shearing tooth holders to be in the form of rotatable shafts. This means that the residual sheet metal grids can be separated into identical pieces in a rotary cutting operation. The shearing teeth can be arranged on the shearing tooth holders in such a manner that the shearing teeth draw in the residual sheet metal grid during cutting. Therefore, the residual grid supply system does not have to be drivable. It is also advantageous in this configuration for the cutting edges of the shearing teeth not to engage simultaneously in the residual sheet metal grid over the length of the cutting edges thereof. In that manner, cutting is brought about instead of the metal sheet being stamped. The shearing teeth can be arranged in such a manner that the metal sheet is not completely cut, but instead is partially deformed. The maximum force occurring is thereby reduced.

The shearing teeth are advantageously arranged on cutter wheels which are arranged on a shaft in a rotationally secure manner. The production of the cutting mechanism is thereby simplified. Individual cutter wheels with shearing teeth fitted thereto can further be readily exchanged.

The shearing teeth are preferably constructed in a triangular manner and a plurality of rows of shearing teeth are provided in a peripheral direction on a shearing tooth holder, the shearing teeth of rows which are adjacent in a peripheral direction being arranged so as to be offset relative to each other. Owing to the triangular construction of the shearing teeth, it is possible for them first to be introduced into the metal sheet by means of a shearing tip.

Consequently, the force necessary is reduced. Owing to the geometry of the shearing teeth, it is possible to adjust the cutting gap by adjusting the spacing of the axes of the shafts. The fact that the shearing teeth are arranged so as to be offset relative to each other ensures that the metal sheet is split into pieces.

It is particularly preferable for the shearing teeth of a first shearing tooth holder to delimit free spaces whose contours are adapted to the contours of the shearing teeth of a second shaft. This means that the shearing teeth of the various shearing tooth holders are offset relative to each other by a half pitch. Complete separation of the residual sheet metal grid is thereby ensured.

According to some aspects, a sheet metal processing unit includes a sheet metal processing machine and a residual grid cutting device. This means that the residual grid cutting device can be linked to a sheet metal processing machine and the comminution of the residual sheet metal grids can be brought about directly after the sheet metal is processed. The residual sheet metal grids do not have to be intermediately stored, which is possible in principle, however, if the residual grid comminution device is operated in isolation.

In a preferred configuration, there may be provision for a transport device to be provided for transporting the residual sheet metal grids from the sheet metal processing machine to the residual grid supply system. Consequently, it is ensured that the processed residual sheet metal grids are removed from the sheet metal processing machine and are correctly supplied to the residual grid cutting device.

A sorting device can be associated with, in particular integrated in, the residual grid cutting device. Consequently, sorting of the residual pieces in accordance with the type of material can be carried out and those pieces can be conveyed to separate collection containers.

The sorting is thereby effected directly after the residual sheet metal grids are cut up so that the sheet metal pieces do not have to be sorted at a later point in time.

Other features will be apparent from the description, the drawings and the claims.

DETAILED DESCRIPTION

Figure 1:
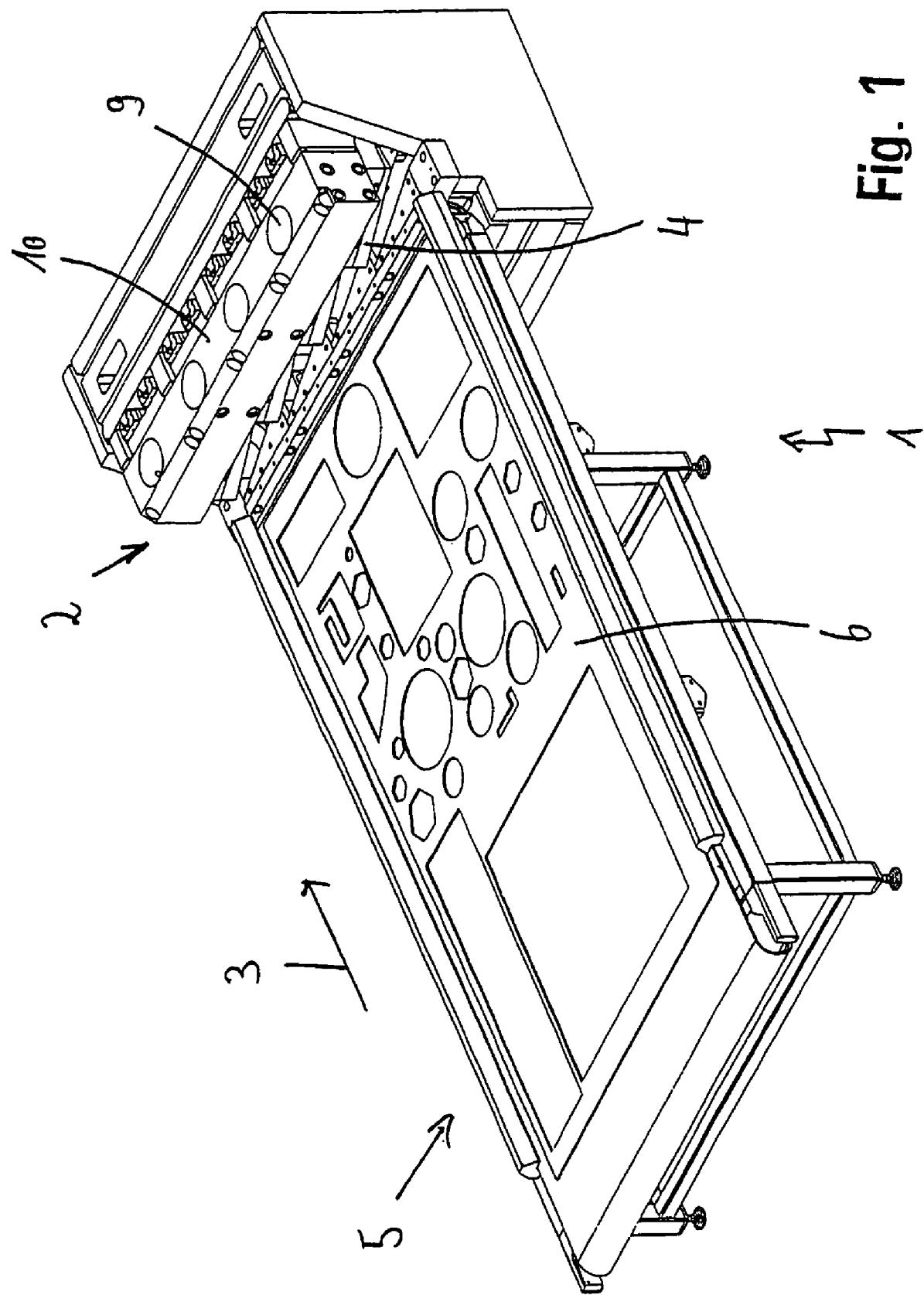
FIG. 1 is a perspective top view of a residual grid cutting device.
Figure 2:
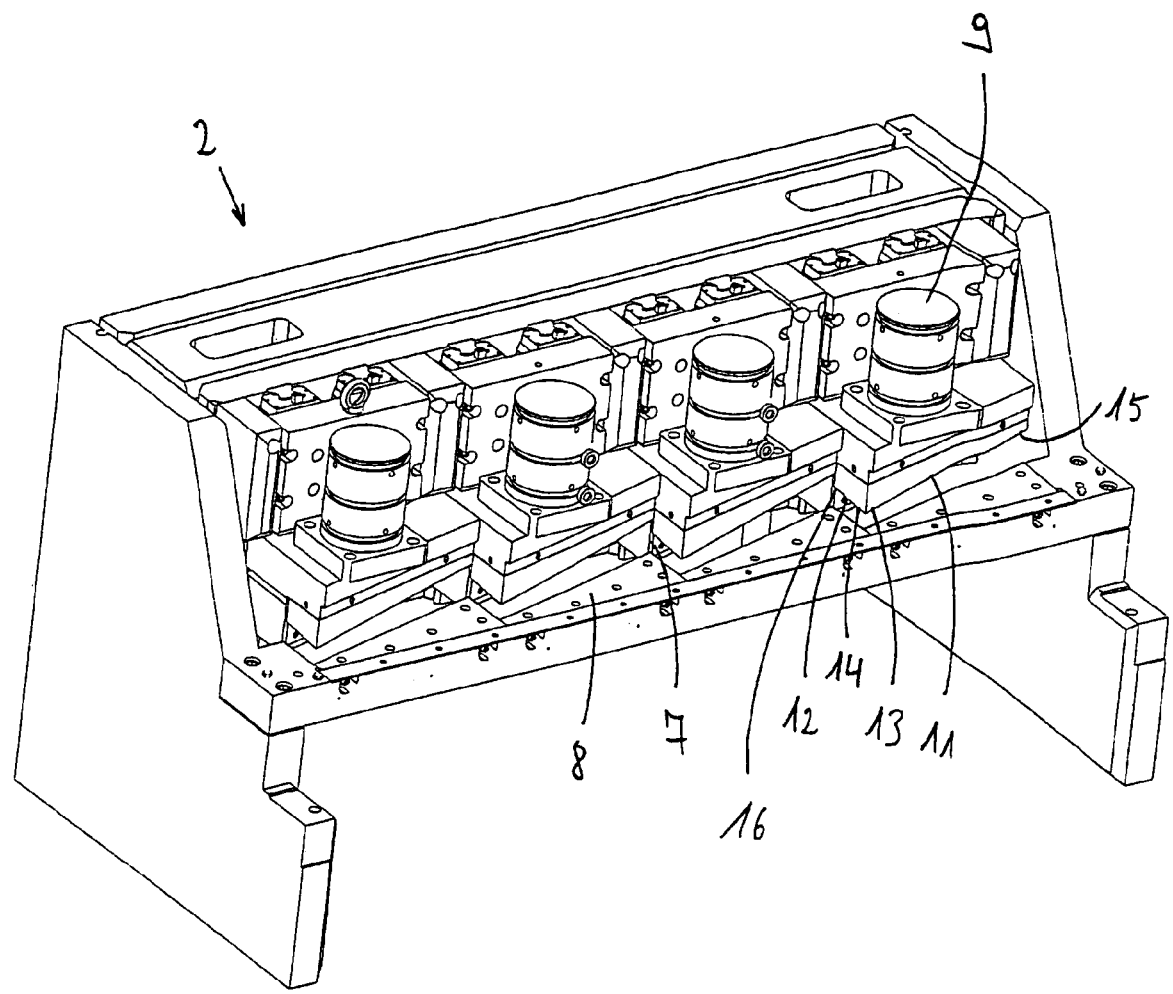
FIG. 2 shows the cutting mechanism of the residual grid cutting device of FIG. 1.

Referring to FIGS. 1 and 2, a residual grid cutting device 1 includes a cutting mechanism 2 which has a plurality of shearing teeth 4 transversely to the residual grid supply direction 3. A residual sheet metal grid 6 is supplied to the cutting mechanism 2 by means of a residual grid supply system 5. The residual sheet metal grid 6 is located in the residual grid supply plane. The residual grid supply system 5 is in the form of a residual grid transport device which can be driven and consequently can move the residual sheet metal grid 6 against at least one stop 7. The stops 7 are arranged on the shearing teeth 4 in the embodiment and are also moved therewith. When the residual sheet metal grid 6 strikes the stop 7, the residual sheet metal grid 6 is supported on a support face 8 whose contour is adapted to the shearing teeth 4. In some embodiments, a stroke device 9 is associated with each shearing tooth 4 in the embodiment. The stroke devices 9 are arranged in a carrier 10 which also acts as a cover. In some embodiments, the shearing teeth 4 can be caused to carry out a stroke movement by means of the stroke devices 9 and moved past the saw-toothlike edge of the support face 8.

In the case of a stroke movement downwards, the cutting edges 11, 12 of the teeth 4 engage in the residual sheet metal grid 6. In this instance, it should be noted that the cutting edges 11, 12 are arranged obliquely relative to the residual grid supply plane. This means that the cutting edges 11, 12 first come into contact with the residual sheet metal grid 6 at one end 13, 14 and, in the case of further stroke movement downwards, the cutting edges 11, 12 come 11 into engagement in a continuous manner with the residual sheet metal grid 6 over the length thereof as far as the ends 15, 16. This means that the cutting edges 11, 12 are constructed so as to be angled for shearing. Therefore, the shearing teeth 4 carry out a cutting movement. During the cutting movement, the shearing teeth 4 are moved past the edge of the support face 8. The support face 8 therefore forms an abutment for the residual sheet metal grid 6. The cutting edges 11, 12 are constructed so as to be of different lengths, the cutting edge 11 being orientated obliquely relative to the residual grid supply direction 3.

Owing to the arrangement of the cutting edges 11, 12 relative to each other, parallelograms are cut out in the embodiment. Therefore, the residual sheet metal grid 6 is divided up into regular parallelograms.

Figure 3:
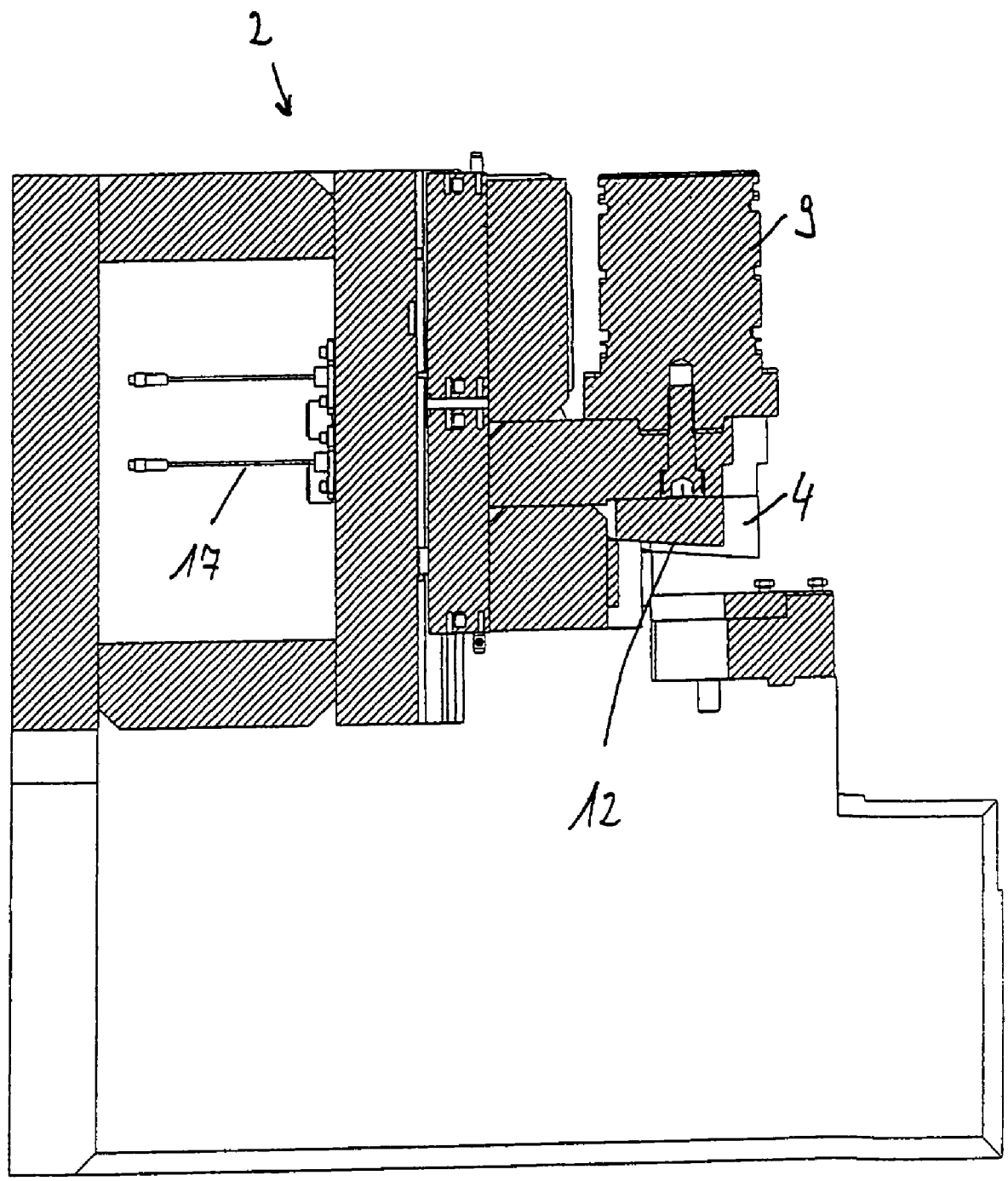
FIG. 3 is a cross-section through the residual grid cutting device.

FIG. 3 is a cross-section through the cutting mechanism 2. It is clearly visible that the cutting edge 12 is also constructed so as to be angled for shearing. The shearing tooth 4 is moved downwards and raised by the stroke device 9. A control unit 17 is arranged in the rear portion of the cutting mechanism 2.

Figure 4A:
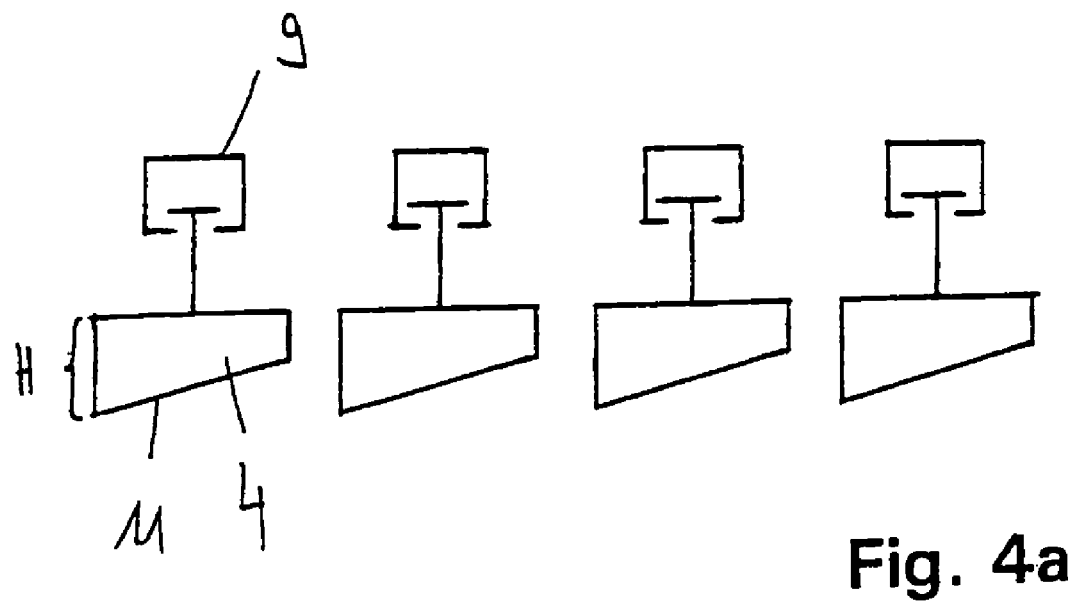
FIG. 4*a* is a schematic illustration of four shearing teeth each having a stroke device.

FIG. 4a shows an arrangement of shearing teeth 4 with each including a respective stroke device 9. Therefore, they can be moved individually or together. They are preferably moved individually in order to cut relatively thick residual sheet metal grids. They may be moved together in order to cut relatively thin metal sheets. The cutting edges 11 are arranged obliquely relative to the residual grid supply plane. All the shearing teeth 4 are of the same height H.

Figure 4B:
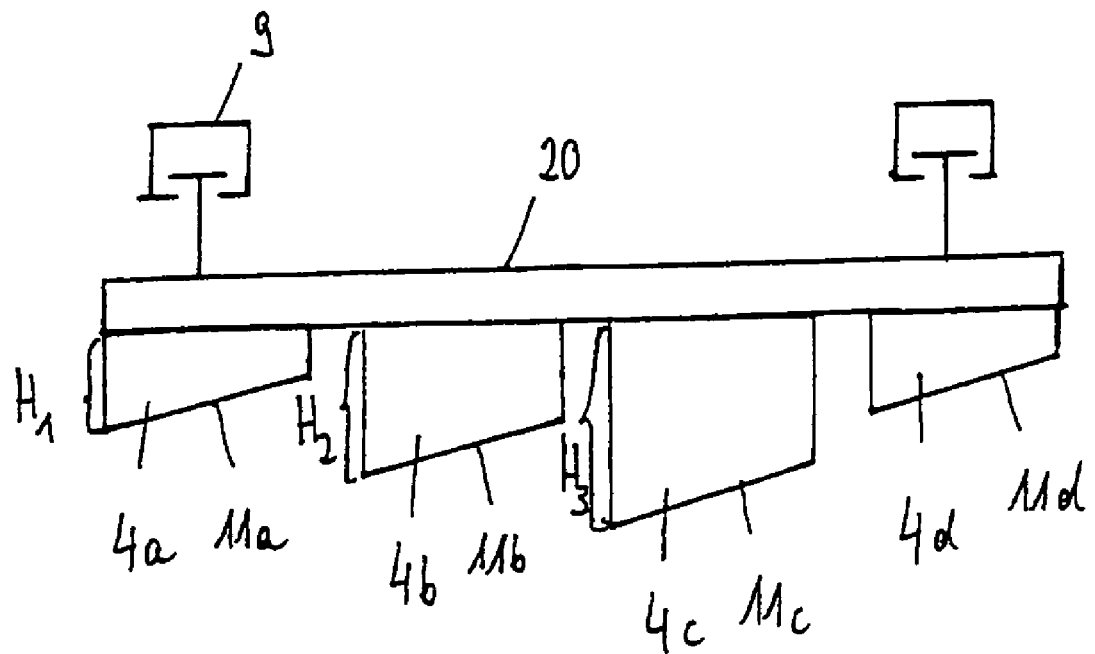
FIG. 4*b* is a schematic illustration of four shearing teeth having a common shearing tooth holder.

According to another embodiment depicted in FIG. 4b, the shearing teeth 4a to 4d are arranged on a common cutting tooth holder 20. The holder 20 is connected to two stroke devices 9. Therefore, the shearing teeth 4a to 4d are moved together. Metal sheets of different thicknesses are still comminuted by a common movement of the shearing teeth 4a to 4d. In order better to distribute the force which has to be applied by the stroke devices 9, the shearing teeth 4a to 4c have different heights HI to H3 so that first the tip of the shearing tooth 4c comes into engagement with the residual sheet metal grid, and subsequently the cutting edge lie gradually comes into engagement with the residual sheet metal grid. Subsequently, the tip of the shearing tooth 4b and then the cutting edge lib gradually come into engagement with the residual sheet metal grid. Subsequently, the tips of the teeth 4a and 4d engage in the residual sheet metal grid and the cutting edges 11a and lid subsequently cut the residual sheet metal grid.

Figure 5:
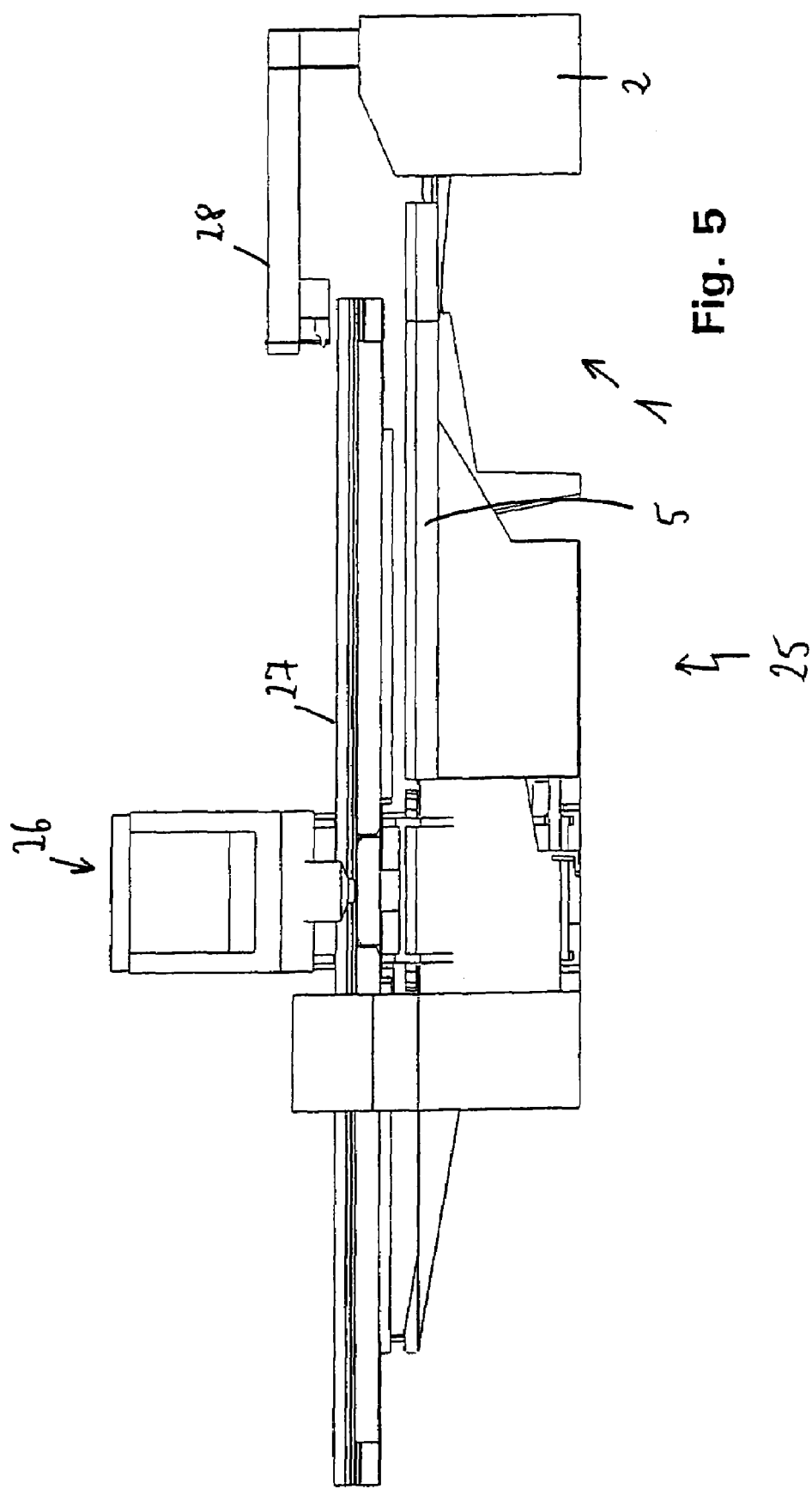
FIG. 5 is a side view of a sheet metal processing unit.

FIG. 5 is a side view of a sheet metal processing unit 25. The sheet metal processing unit 25 comprises a sheet metal processing machine 26 which comprises a table 27 for transporting metal sheets or residual sheet metal grids. A residual grid cutting device 1 is coupled therewith, the residual grid supply system 5 being arranged in a plane below the table 27. A transport device 28 is provided in order to place residual sheet metal grids from the table 27 on the residual grid supply system 5. The residual sheet metal grids are supplied to the cutting mechanism 2 by means of the residual grid supply system 5.

Figure 6:
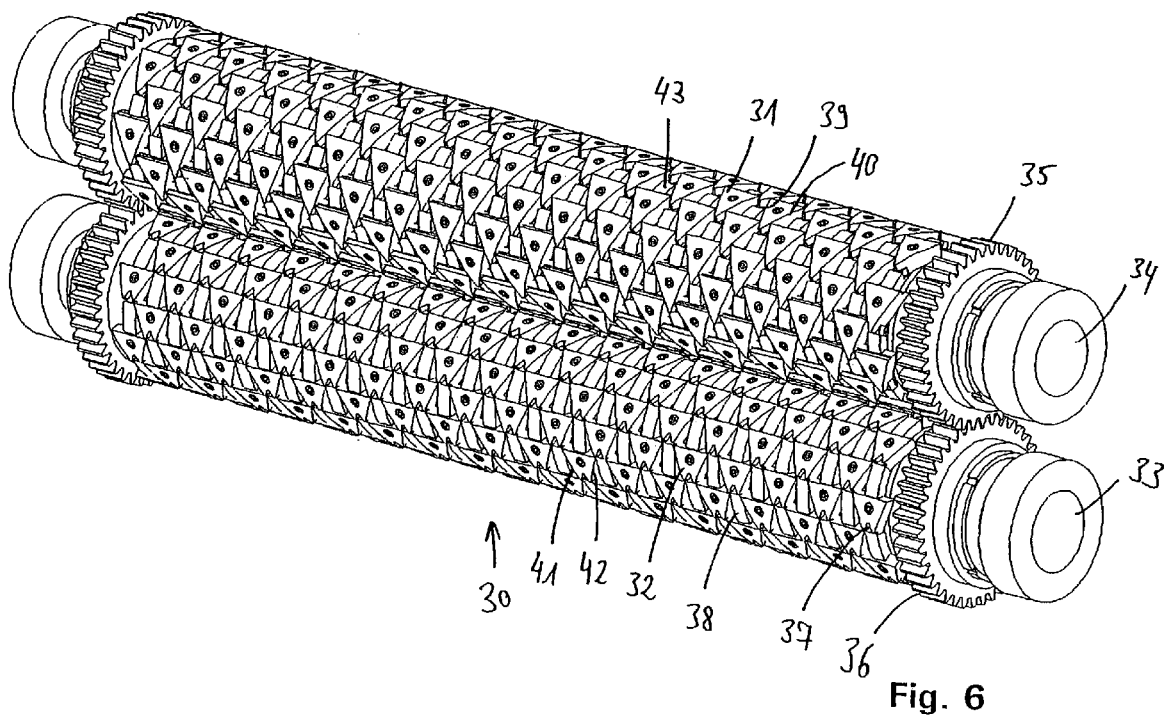
FIG. 6 shows part of a cutting mechanism of a residual grid cutting device.

An alternative configuration of a cutting mechanism 30 is illustrated in FIG. 6. The cutting mechanism 30 comprises a plurality of shearing teeth 31, 32 which are arranged on 13 shearing tooth holders 33, 34 which are in the form of rotatable shafts. The rotatable shearing tooth holders 33, 34 are coupled for movement by means of gears 35, 36. The shearing teeth 31, 32 of the various shearing tooth holders 33, 34 are constructed so as to be different. The shearing teeth 31 are constructed in a substantially triangular manner, whereas the shearing teeth 32 have a notch 37. The shearing teeth 31, 32 are each arranged in rows on the shearing tooth holders 33, 34, the shearing teeth 31, 32 of rows which are adjacent in a peripheral direction being arranged so as to be offset relative to each other. The shearing teeth 31 of adjacent rows further overlap each other slightly.

Four shearing teeth 32 delimit a free space 38, the contour of the free space 38 being adapted to the shearing teeth 31. Accordingly, four shearing teeth 31 form a free space 43 which can receive a shearing tooth 32. Since the shearing teeth 31, 32 are arranged on rotatable shafts, the cutting edges 39, 40, 41, 42 of the shearing teeth 31, 32 come into engagement with the residual sheet metal grid not by means of the entire length thereof simultaneously, but instead gradually with a continuous cutting movement.

Figure 7:
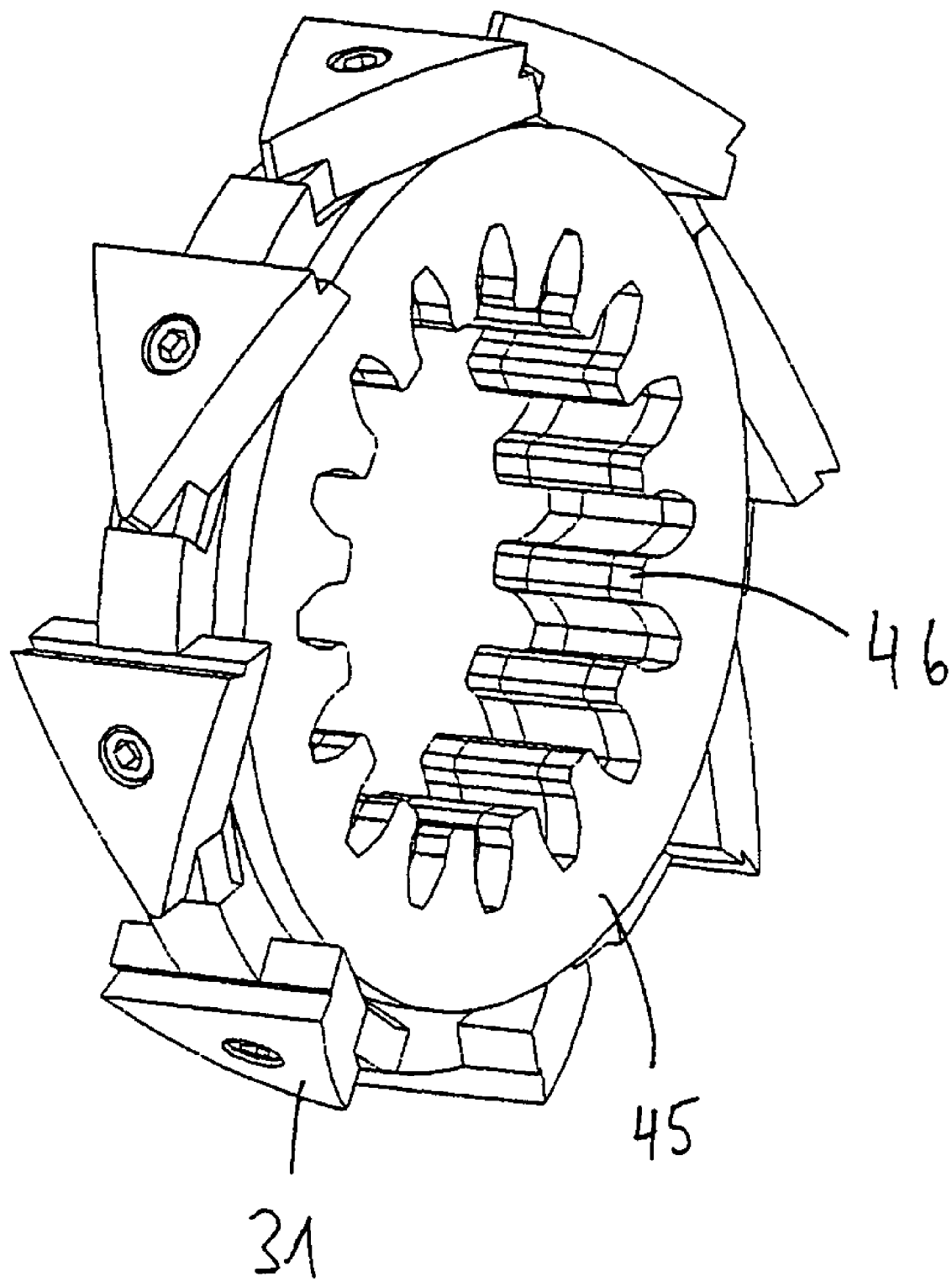
FIG. 7 shows a cutter wheel of the arrangement according to FIG. 6.

FIG. 7 shows a cutter wheel 45, on which a plurality of shearing teeth 31 are arranged. In particular, they are screwed to the cutter wheel 45. In that manner, the shearing teeth 31 can be changed relatively readily. The cutter wheel 45 has tappets 46 so that it can be arranged on a shaft in a rotationally secure manner. Since the cutter wheel 45 can be fitted to a shaft, it can readily be changed.

Other implementations are within the scope of the following claims.

What is claimed is:

1. A device for comminuting a residual sheet metal grid, the device comprising:
   a grid supply system defining a grid supply plane and supplying the grid in a longitudinal direction;
   a cutting assembly comprising a plurality of shearing teeth extending along a transverse direction transverse to the longitudinal direction, wherein the shearing teeth include at least one of a cutting edge or a cutting edge portion, wherein the assembly is constructed and arranged to cut the metal grid along the longitudinal direction and the transverse direction; and a stop which limits the advance of the residual sheet metal arid by the arid supply system, wherein the stop is arranged on at least one of the shearing teeth.

2. The device according to claim 1, wherein a first end of at least one of the cutting edge or the cutting edge portion is oriented to engage the residual sheet metal grid before a second end of at least one of the cutting edge or the cutting edge portion.

3. The device according to claim 1, wherein at least one cutting edge is orientated obliquely relative to the grid supply plane.

4. The device according to claim 1, wherein at least one cutting edge is orientated along the transverse direction.

5. The device according to claim 1, wherein at least one cutting edge is orientated along the transverse direction and at least one cutting edge is oriented along the longitudinal direction.

6. The device according to claim 1, wherein the shearing teeth comprise two cutting edges orientated along the transverse direction.

7. The device according to claim 1, wherein the cutting edges comprise different lengths.

8. The device according to claim 7, wherein the cutting edges comprise progressively longer lengths along the transverse direction.

9. The device according to claim 1, wherein the cutting assembly further comprises:
    a support face proximate the shearing teeth to support the metal grid; and
    at least one stroke device operably connected to the shearing teeth to move the shearing teeth past the support face.

10. The device according to claim 9, further comprising a stroke device operably connected to each shearing tooth.

11. The device according to claim 9, wherein the support face comprises a contour adapted to the shearing teeth.

12. The device according to claim 1, wherein the cutting assembly further comprises a cutting tooth holder on which the shearing teeth are arranged, the cutting tooth holder adapted to be driven by at least one stroke device.

13. The device according to claim 1, wherein the grid supply system comprises a drivable residual grid transport device.

14. The device according to claim 13, wherein the device is operated in a clocked manner and the advance of the residual grid transport device is adapted to the stop.

15. The device according to claim 1, wherein the device is operated in a clocked manner and the advance of the residual grid transport device is adapted to at least one of the size of the shearing teeth or the depth of the shearing teeth.

16. The device according to claim 1, wherein the shearing teeth are arranged on mutually opposite shearing teeth holders.

17. The device according to claim 16, wherein the shearing teeth holders comprise rotatable shafts.

18. The device according to claim 1, further comprising cutter wheels arranged on a shaft in a rotationally secure manner, wherein the shearing teeth extend from the cutter wheels.

19. The device according to claim 18, wherein the shearing teeth are substantially triangular and arranged in a plurality of rows in a peripheral direction on a shearing tooth holder.

20. The device according to claim 19, wherein adjacent rows of shearing teeth are arranged so as to be offset relative each other.

21. The device according to claim 19, wherein the shearing teeth of a first shearing tooth holder delimit free spaces which define contours adapted to the contours of the shearing teeth of a second shearing tooth holder.

22. The device according to claim 1, wherein a stop is arranged on each shearing tooth.

23. A processing system for a residual sheet metal grid, the system comprising:
    a sheet metal processing machine;
    a grid supply system defining a grid supply plane and supplying the grid in a longitudinal direction;
    a cutting assembly comprising a plurality of shearing teeth extending along a transverse direction transverse to the longitudinal direction, wherein the shearing teeth include at least one of a cutting edge and a cutting edge portion, wherein the assembly is constructed and arranged to cut the metal grid along the longitudinal and the transverse direction; and
    a stop which limits the advance of the residual sheet metal grid by the grid supply system, wherein the stop is arranged on at least one of the shearing teeth.

24. The system according to claim 23, further comprising a transport device to transport the residual sheet metal grids from the sheet metal processing machine to the grid supply system.

* * * * *

UNITED STATES PATENT AND TRADEMARK OFFICE
CERTIFICATE OF CORRECTION

PATENT NO. : 7,661,615 B2 Page 1 of 1
APPLICATION NO. : 11/254538
DATED : February 16, 2010
INVENTOR(S) : Jörg Heusel and Tobias Meck It is certified that error appears in the above-identified patent and that said Letters Patent is hereby corrected as shown below:

On the Title page, Item (73) Assignee, delete "Werkzeugmachinen" and insert --Werkzeugmaschinen--.

In claim 1, column 7, line 5, delete "arid" and insert --grid--.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO.      : 7,661,615 B2
APPLICATION NO. : 11/254538
DATED           : February 16, 2010
INVENTOR(S)     : Heusel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Twenty-eighth Day of December, 2010

David J. Kappos
*Director of the United States Patent and Trademark Office*